United States Patent
Carbune et al.

(10) Patent No.: US 12,518,749 B2
(45) Date of Patent: Jan. 6, 2026

(54) ADAPTIVE SENDING OR RENDERING OF AUDIO WITH TEXT MESSAGES SENT VIA AUTOMATED ASSISTANT

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 232 days.

(21) Appl. No.: 18/446,798

(22) Filed: Aug. 9, 2023

(65) Prior Publication Data

US 2025/0054495 A1 Feb. 13, 2025

(51) Int. Cl.
| | | |
|---|---|---|
| *G10L 15/19* | (2013.01) | |
| *G10L 15/06* | (2013.01) | |
| *G10L 15/22* | (2006.01) | |
| *G10L 21/028* | (2013.01) | |
| *G10L 25/51* | (2013.01) | |

(52) U.S. Cl.
CPC .............. *G10L 15/19* (2013.01); *G10L 15/22* (2013.01); *G10L 21/028* (2013.01); *G10L 25/51* (2013.01); *G10L 15/063* (2013.01); *G10L 2015/228* (2013.01)

(58) Field of Classification Search
CPC ......... G10L 15/19; G10L 15/22; G10L 25/51; G10L 15/063; G10L 15/32
See application file for complete search history.

(56) References Cited

U.S. PATENT DOCUMENTS

| | | | | |
|---|---|---|---|---|
| 11,636,851 | B2* | 4/2023 | Mahmood | G06F 3/167 704/257 |
| 11,783,828 | B2* | 10/2023 | Sharifi | G06F 16/90332 704/235 |
| 11,977,816 | B1* | 5/2024 | Sepasi Ahoei | G06F 40/134 |
| 12,211,517 | B1* | 1/2025 | Maas | G10L 15/26 |
| 2014/0245140 | A1* | 8/2014 | Brown | G06Q 30/0601 715/708 |
| 2017/0263248 | A1* | 9/2017 | Gruber | G06F 40/166 |
| 2017/0270927 | A1* | 9/2017 | Brown | G06F 3/167 |
| 2021/0258641 | A1* | 8/2021 | Konzelmann | H04N 21/25891 |
| 2022/0293109 | A1* | 9/2022 | Sharifi | G10L 15/28 |
| 2022/0319219 | A1* | 10/2022 | Tsibulevskiy | G06F 18/40 |
| 2023/0025709 | A1* | 1/2023 | Sharifi | G06F 3/167 |

* cited by examiner

*Primary Examiner* — Michael N Opsasnick
(74) *Attorney, Agent, or Firm* — Gray Ice Higdon

(57) ABSTRACT

Implementations set forth herein relate to an automated assistant that can selectively communicate audio data to a recipient when a user solicits the automated assistant to send a text message to the recipient. The audio data can include a snippet of audio that characterizes content of the text message, and the automated assistant can communicate the audio data to the recipient when score data for a speech recognition hypothesis does not satisfy a confidence threshold. The score data can correspond to an entirety of content of a text message and/or speech recognition hypothesis, and/or less than an entirety of the content. A recipient device can optionally re-process the audio data using a model that is associated with the recipient device. This can provide more accurate transcripts in some instances, thereby improving accuracy of communications and decreasing a number of corrective messages sent between users.

19 Claims, 5 Drawing Sheets

ADAPTIVE SENDING OR RENDERING OF AUDIO WITH TEXT MESSAGES SENT VIA AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Voice-based messaging, facilitated by such automated assistants, has become a prevalent mode of communication. However, there remain several technical inefficiencies that, when employing such messaging techniques, impact the utilization of processing bandwidth, the accuracy of transcriptions, and power consumption. For example, a particular inefficiency is the overuse of processing capacity by automatic speech recognition (ASR) systems. Despite significant advancements, ASR systems can still produce errors due to factors such as homophones, accents, and/or background noise. These errors necessitate additional processing to correct or clarify, leading to an inefficient use of processing capacity.

Another inefficiency is the lack of flexibility in the current messaging modalities. For example, many systems only allow for either text-based or voice-based messages, without the ability to intelligently switch between the two based on the context or content of a message. This rigidity in modality selection can lead to inaccuracies in the communication, requiring further processing to resolve. Furthermore, current systems do not take into account the context of the sender and/or the recipient when deciding on the messaging modality to employ. For example, a sender may be in a noisy environment where a voice message would be more appropriate, or a recipient may be in a quiet office space where playing an audio message would be inappropriate. The inability of current systems to adapt to these contextual factors can lead to unnecessary power consumption, as devices may expend energy processing and transmitting information that is not optimally suited for the context.

SUMMARY

Implementations set forth herein relate to an automated assistant or other application that can selectively communicate an audio recording with a text message in certain circumstances when confidence in a result of a speech-to-text process is low and/or content of the audio is otherwise relevant. For example, the automated assistant can be invoked by a user who is directing the automated assistant to send a message to another user. A spoken utterance provided by the user can be, for example, "Assistant, send a message to David saying, 'Give Carin a call ASAP.'" Because of how the user pronounced the name "Carin," the automated assistant can assign a low confidence to a transcription of the message and/or a portion of the transcription. For example, speech-to-text processing can result in a score of 27% confidence being assigned to the word "Karen," the entire transcription, and/or another portion of the transcription. The score can be compared to a confidence threshold (e.g., greater than or equal to 33%), and when the score does not satisfy the confidence threshold, the automated assistant can cause an audio recording of speech of the user to be communicated to the other user with the text message. In some implementations, the text message can be provided to the other user with an indication of any one or more words, phrases, and/or other portions of text that were not generated with a threshold degree of confidence. For example, the word "Karen" can be italicized in the text message to indicate that the text was generated from speech and was not generated with a threshold degree of confidence. In some implementations, the other user can receive the text message (e.g., "Give Karen a call ASAP") with an audio file as an attachment, and the audio file can include the portion of the spoken utterance corresponding to the text message to be provided to the other user, without other portions of the speech (e.g., "Assistant, send a message . . . "). In this way, the other user can optionally select to listen to the audio file, or a relevant segment of the audio file, or rely on text message to interpret the message that the user wanted to convey to the other user.

In some implementations, the audio file that is communicated to the other user can be processed using a speech-to-text process that is adapted for the other user to generate an updated transcript. In this way, processing of the audio file can result in a higher confidence score for the word "Carin," at least relative to the confidence score generated for the word "Karen." In some implementations, when content of the updated transcript is generated with a confidence score that satisfies the confidence threshold and/or another confidence threshold, the audio file can be removed from memory in furtherance of preserving memory of any affected computing devices. However, when the confidence score for the updated transcript still does not satisfy the confidence threshold, the audio file can be automatically played back for the other user, since neither transcript was created with a threshold degree of confidence. In some implementations, the message communicated to the other user can have one or more selectable links, GUI elements, and/or other portions that, when selected, cause playback of audio corresponding to that particular portion, without playing other portions of the audio file. For example, the text "Karen" can be selectable such that, when the user taps a graphical user interface (GUI) at a location corresponding to the transcript text "Karen," the automated assistant can cause playback of a snippet of audio that is limited to the user speaking the word "Carin." Alternatively, or additionally, in response to the user tapping the GUI at the location corresponding to the transcript text "Karen," the automated assistant can render additional transcripts corresponding to a top-N transcripts (e.g., wherein N is a number of the transcripts that were determined to be most accurate candidates) in contexts when rendering audio is not suitable (e.g., when the automated assistant determines, with prior permission from the user, that the user is located in a quiet environment or at a location that is typically associated with a preference for silence).

In some implementations, a context of the sender of a message and/or a recipient of the message can be considered when determining whether to send an audio file with a text message. For example, background noise apparent at the sender and/or at the recipient can serve as a basis for communicating, to a recipient, audio data with textual data. For example, a user can provide a spoken utterance to their automated assistant during a party at their home in furtherance of directing the automated assistant to send a message to another person. When the user is providing the spoken utterance, a party participant can chime in with additional speech that is relevant to the message that the user wants to send to the other person. The automated assistant can process audio data captured by a computing device when the user is providing the spoken utterance, and, as a result, capture the speech of the party participant. When the spoken utterance of the user is transcribed, textual data of the transcript can be processed to determine whether speech of the party participant is relevant to the textual data. When the speech of the party participant is determined to be relevant to the textual data (e.g., to a threshold degree of relevance) and thus the message to be communicated, the automated assistant can communicate the audio data with the textual data to the other person (i.e., the recipient).

In some implementations, a context of the recipient can be utilized, with prior permission from the recipient, to determine whether to communicate audio data with textual data when sending a text message. For example, contextual data available to the automated assistant can indicate that a computing device associated with the recipient is experiencing a threshold level of background noise. Based on this contextual data, the automated assistant can determine that the recipient is in an environment in which playback of audio would not be inappropriate. For example, when the contextual data indicates that a threshold level of background noise is not apparent at the computing device associated with the recipient (e.g., because the recipient is at a library), the automated assistant can bypass communicating the audio data with the textual data. In this way, computational resources of any affected devices can be preserved according to any detected contexts of the sender and/or the recipient—as opposed to indiscriminately sending audio data with every text message.

In some implementations, speaker turn detection, speaker diarization and/or speech diarization can be performed to annotate audio files with speech diarization data and/or other information regarding the person that is speaking, when certain words, phrases, and/or phonemes of a speech recognition hypothesis are spoken, when certain background noise is apparent, and/or any other information. Alternatively, or additionally, an audio file corresponding to a request to send a text message can be parsed into multiple audio files (e.g., such that an audio file does not embody an entirety of content of the spoken utterance) according to the annotations, and audio unrelated to the content of a text message can be discarded to preserve memory and preserve privacy. When a confidence score for a word or phrase of a text message transcription is determined to not satisfy a confidence threshold, an audio file corresponding to that word or phrase can be linked to the text message. Thereafter, a recipient of the text message can tap on the word or phrase in the text message to cause playback of the audio file. In some implementations, when a threshold portion or percentage of the text message is not transcribed with a threshold degree of confidence, an audio file corresponding to the entire text message can be communicated to the recipient with or without the text message. In some implementations, the audio that is communicated with the text message can be communicated through the same application that the text message is communicated through or a different application (e.g., a cloud-storage application or email application).

In some implementations, a speech model associated with the recipient can be utilized to re-process audio received from a sender in furtherance of generating textual content that has a higher confidence score than the original textual content generated using another speech model associated with the sender. In some implementations, an indication of a quality of model at the recipient can be available to an application associated with the sender and, based on this indication, re-processing of the received audio can be performed, or not performed, using the recipient model. For example, the recipient can be at home with an assistant-enabled device connected to Wi-Fi and grid power, therefore the speech model associated with the recipient can be more robust and/or higher quality compared to another speech model associated with the sender (e.g., the sender may be on their phone, which may be have a low charge). Such information regarding the quality and/or types of models available to the sender and/or recipient can be available with prior express permission from the sender and/or the recipient.

In some implementations, messages can be communicated with indications of whether portions of text were misrecognized, whether certain metadata is associated with portions of text, and/or whether certain context is relevant to portions of text. For example, a text message that is rendered at a messaging application for a recipient can be rendered in a certain style that is meant to indicate a portion of the text message was transcribed from audio that included background noise. Alternatively, or additionally, the text message can be rendered with certain features that indicate another user, besides the sender, was speaking within a duration a time that the sender initiated the request for the automated assistant to send a text message to the recipient. In some implementations, certain indications can be omitted based on a context of the recipient, such as when the recipient is using earbuds and not viewing their messaging device, and/or the recipient would otherwise not be able to acknowledge the indications.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
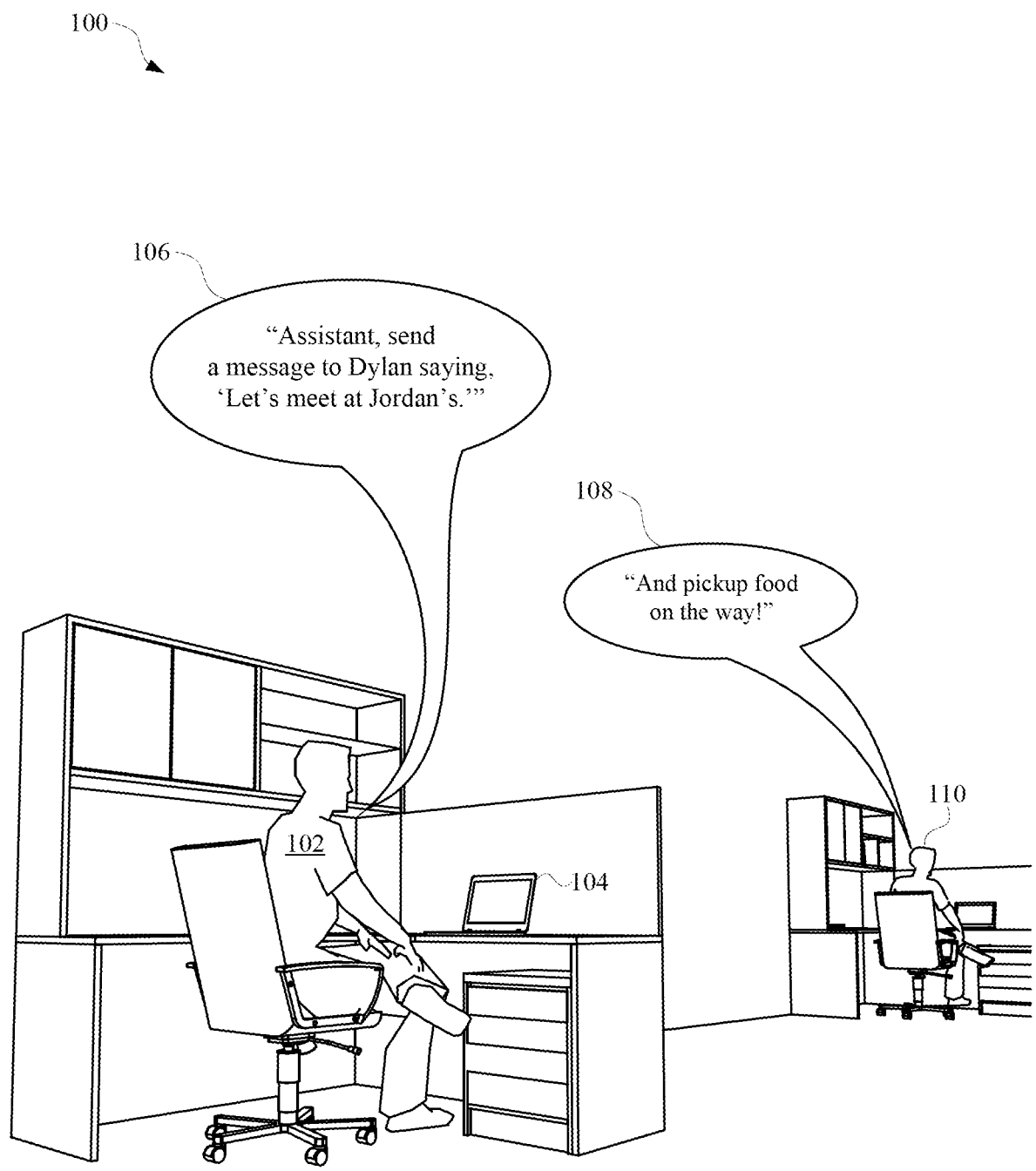
FIG. 1A and FIG. 1B illustrate views of a user interacting with an automated assistant that can proactively send portions of audio with certain text messages.
Figure 1B:
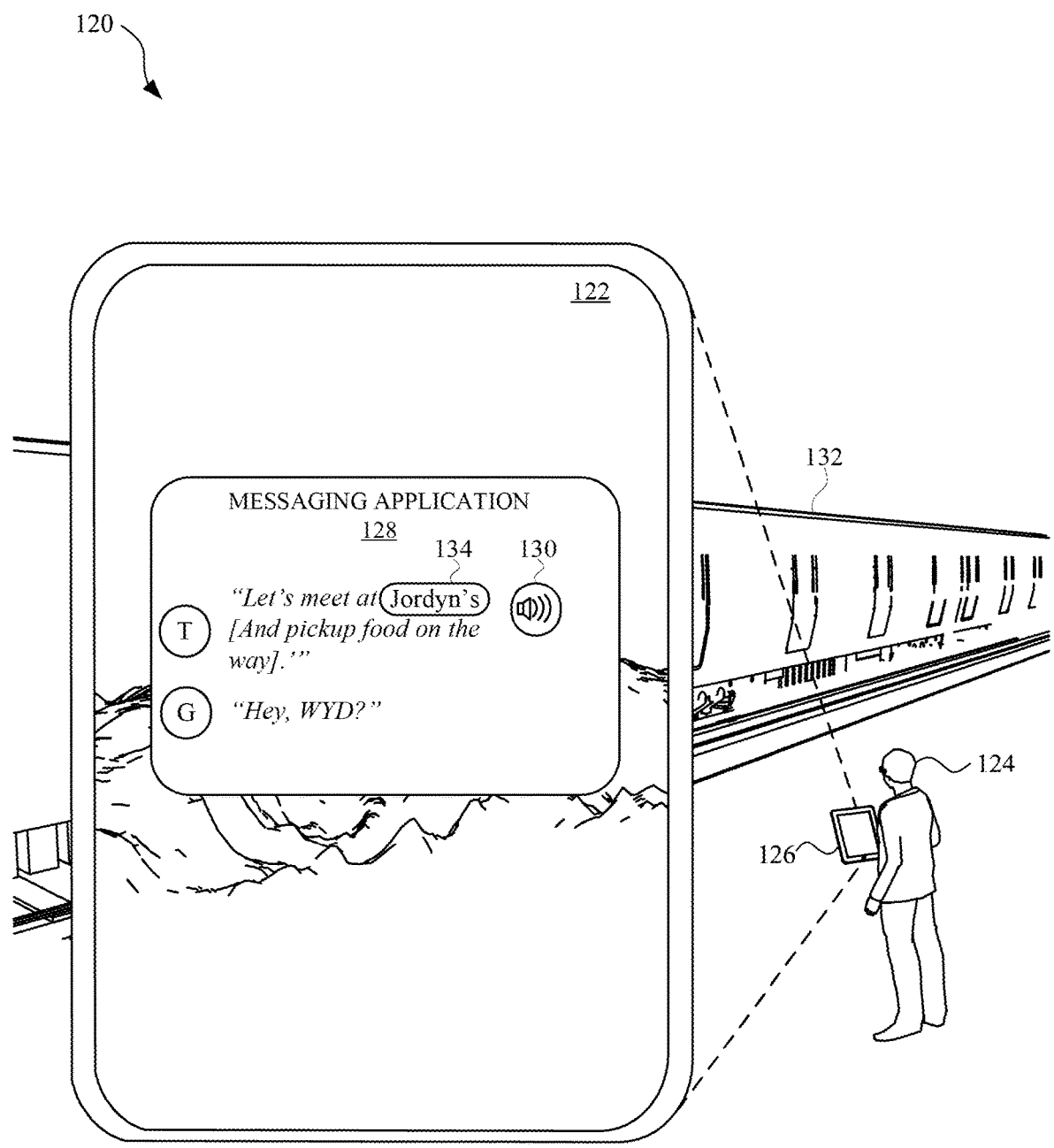

FIG. 1A and FIG. 1B illustrate views of a user 102 interacting with an automated assistant that can proactively send portions of audio with certain text messages. The user 102 can be interacting with a computing device 104 that can provide access to the automated assistant. The user 102 can provide a spoken utterance 106 such as, "Assistant, send a message to Dylan saying, 'Let's meet at Jordan's'" in furtherance of causing the automated assistant to send a text message to a contact "Dylan." When providing the spoken utterance 106, another person 110 can attempt to contribute to the text message with an audible comment 108 such as, "And pickup food on the way!" Audio captured by the computing device 104 can be processed to generate a transcript of any speech apparent in the audio, and also annotate the transcript with information that can be useful to a recipient of the text message. Alternatively, or additionally, the transcript can be annotated with information that indicates a confidence in which the transcript, or portions of the transcript, accurately characterizes any speech apparent in the audio.

For example, the automated assistant and/or another application can process the audio to generate a transcript such as the transcript provided by the messaging application 128 in FIG. 1B. The transcript can be, "Let's meet at Jordyn's," which can be generated with annotations to indicate certain features apparent in the audio. In some implementations, one or more portions of the transcript can be annotated to indicate a confidence score that each respective portion was generated using a speech processing model associated with the user 102. Alternatively, or additionally, a confidence score for a portion of the transcript can be generated and compared to a confidence threshold in furtherance of determining whether to provide audio data to the recipient with the text message and/or otherwise annotate the portion of the transcript. For example, the word "Jordan" can be generated with a confidence score that does not satisfy the confidence threshold, therefore audio captured by the automated assistant can be provided with the text message to the recipient. Alternatively, or additionally, the portion of the text message having the word "Jordan" can be annotated to indicate the confidence score for the word "Jordan."

When the text message and/or audio is received at a computing device 126 associated with a recipient 124, as illustrated in FIG. 1B, a messaging application 128 can render textual data associated with the text message and/or audio data associated with the text message. For example, because the word "Jordan" was generated with a confidence score that did not satisfy the confidence threshold, a speech processing model associated with user 102 can re-process the audio data communicated from the computing device 104. Based on this reprocessing, and because the recipient 124 may have a stored contact by the name of "Jordyn," the text message can be displayed with an annotated portion 134 that indicates the word "Jordyn" was not originally sent from the user 102. Alternatively, or additionally, the annotated portion 134 can be selectable such that, when the recipient 124 taps on the word "Jordyn" at the display interface 122, an audio snippet of the user 102 speaking the word "Jordan" can be played back for the recipient.

In some implementations, when content of any background noise is relevant to a text message, the textual data rendered by the messaging application 128 can be annotated to indicate any relevant information. For example, because the other person 110 provided the audible comment 108, the automated assistant can process audio embodying this audible comment to determine whether the audible comment 108 is relevant and/or whether the user 102 would like the audible comment acknowledged in the text message. In some implementations, the automated assistant can omit annotating text messages based on background noise because a user did not provide express permission for the automated assistant to do so. However, when the automated assistant is given express permission to do so, the automated assistant can process audio data for the spoken utterance 106 and the audible comment 108 to determine whether they exhibit a threshold degree of relevance to each other.

In some implementations, this process can be performed using one or more heuristic processes and/or one or more machine learning models (e.g., mapping embeddings for each spoken utterance to determine their latent distance apart in latent space). When the audible comment 108 is determined to have a threshold relevance to the spoken utterance 106, the natural language content of the background noise can be transcribed and rendered with the text message and/or with an applicable annotation. For example, text of the audible comment 108 can be included in brackets, or with another visible feature, to indicate to the recipient 124 that certain text of the text message was not spoken by the user 102. In some implementations, when such background noise or background utterances are considered relevant to a text message, the text message can be communicated with an audio file. When the text message is rendered by the messaging application 128, a selectable element 130 can be rendered to allow the recipient to toggle playback of audio embodying the background noise or background utterances. Alternatively, or additionally, a separate application (e.g., the recipient's 124 automated assistant application) can be initialized upon receiving the audio data, and the separate application can be utilized for playback of any received audio, rather than relying on the messaging application.

In some implementations, background noise detected at the computing device 126 associated with the recipient 124 can be a basis for determining whether to play back audio received from the user 102 and/or re-perform speech processing at the recipient's 124 computing device 126. For example, the recipient 124 can be in an area with a lot of background noise (e.g., near a train 132 that is starting and stopping), and an automated assistant associated with the recipient 124 can determine the level of background noise with prior permission from the recipient 124. When the level of background noise and/or content of the background noise satisfies certain criteria (e.g., a noise threshold), the audio received from the computing device 104 can be played back for the recipient 124 and/or reprocessed. For example, because the recipient 124 is at a location in which the background noise satisfies a background noise threshold, the audio of the spoken utterance 106 can be communicated from the computing device 104 and/or played back for the recipient 124 proactively. In some implementations, this can be performed at least partially based on instances of the automated assistant at each respective computing device commuting with each other, with express permission from each user. For example, the computing device 104 can receive a communication from the computing device 126 indicating that the recipient 124 is at a location that is not exhibiting a threshold level of background noise and, in response, bypass communicating audio data with the text message. Alternatively, the computing device 104 can receive a communication from the computing device 126 indicating that the recipient 124 is at another location that is exhibiting the threshold level of background noise, and, in response, communicate the audio data, or a portion of audio data, with the text message.

Figure 2:
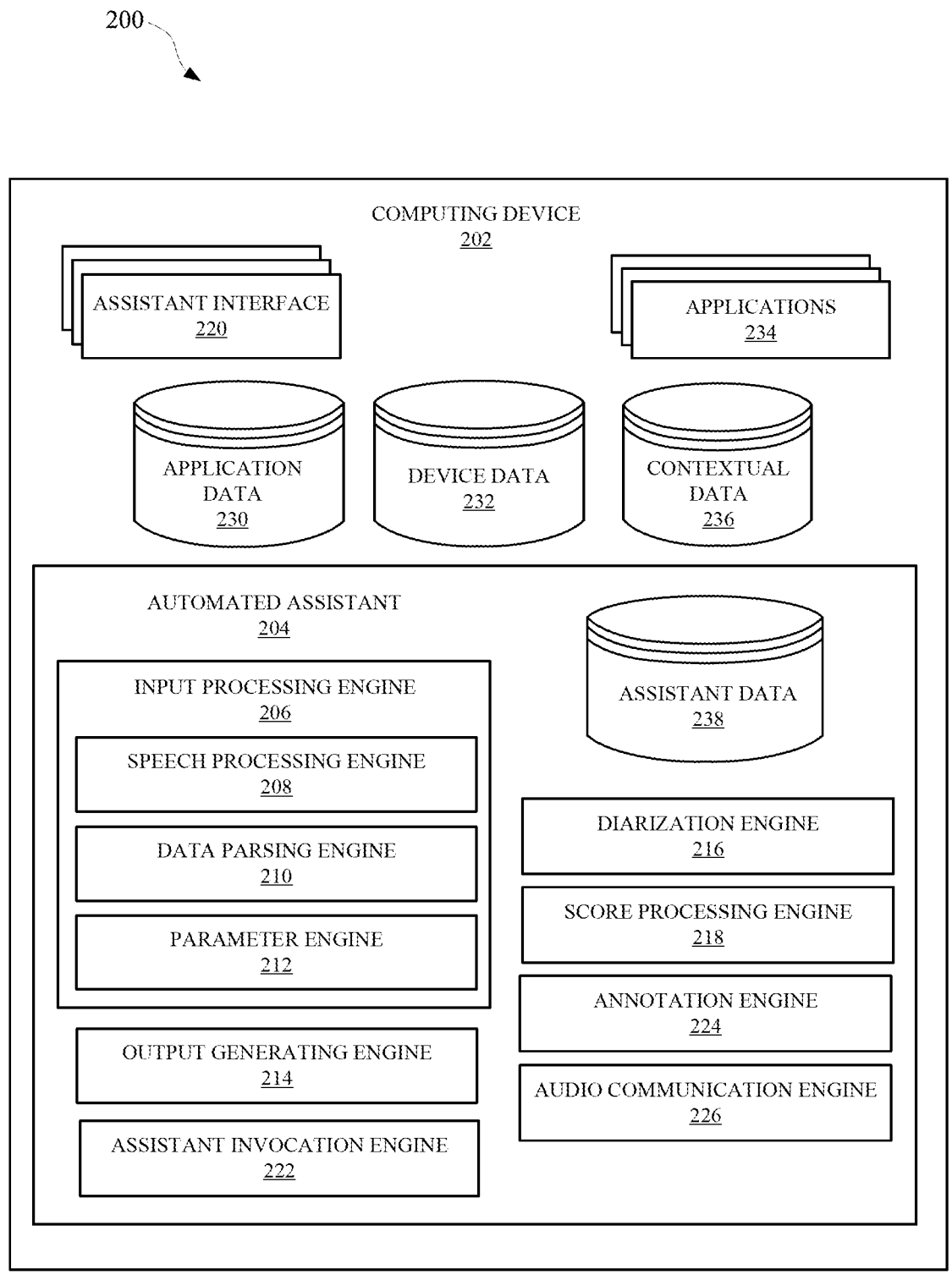
FIG. 2 illustrates a system that provides an automated assistant with an ability to selectively communicate audio data with text messages according to a confidence in a speech-to-text process, and/or other contextual data associated with the text messages.

FIG. 2 illustrates a system 200 that provides an automated assistant 204 with an ability to selectively communicate audio data with text messages according to a confidence in a speech-to-text process, and/or other contextual data associated with the text messages. For example, the automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to expressly speak an invocation phrase to invoke the automated assistant 204, or consider the data to be indicative of an intent by the user to invoke the automated assistant—in lieu of requiring the user to expressly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user, or other background noise or utterances, based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a diarization engine 216 that can process audio data in furtherance of isolating certain portions of audio that correspond to certain speech, background noise, and/or other information that can be relevant to an automated assistant 204. For example, the diarization engine 216 can process audio data of a spoken utterance to isolate a portion of audio data that relates to content of a text message, when the spoken utterance is provided to cause the automated assistant 204 to send a text message. In some implementations, the diarization engine 216 can process the audio data in furtherance of isolating speech of one or more other persons, besides the person that provided the spoken utterance. Alternatively, or additionally, the diarization engine 216 can process the audio data in furtherance of isolating certain types of background noise such as, but not limited to, music, background speech, sounds related to a particular object, and/or any other audio that can be relevant to a text message. In some implementations, the audio data received by the automated assistant can be annotated to indicate time stamps when certain audio is apparent in the audio data, thereby allowing another device to present the audio with audible or visible features.

In some implementations, the system 200 can include a score processing engine 218, which can process any instance of audio data generated by the diarization engine 216 and/or the system 200 to determine confidence scores for how well the audio has been accurately characterized. For example, the input processing engine 206 can generate a transcript of the text message to be sent to another person, and the score processing engine 218 can determine a score for one or more words, phrases, and/or phonemes of the transcript. Each score can be utilized by the system 200 and/or another device or application to determine how to present the text message to the recipient and/or whether to communicate audio data with the text message. In some implementations, other audio features beyond the speech of a user can be scored to indicate a degree of confidence that a transcript characterizes the content of the audio. For example, the transcript and/or other speech recognition hypothesis can include metadata that indicates a context of a spoken utterance (e.g., whether a train was heard in the background), and the score processing engine 218 can indicate a degree of confidence that the background noise has been accurately described by the metadata.

In some implementations, the system 200 can include an annotation engine 224, which can utilize data generated by the diarization engine 216, the input processing engine 206, and/or the score processing engine 218 to annotate audio data, textual data, and/or other data processed by the system 200. These annotations can be available to a recipient device with prior permission from a user of the automated assistant 204, thereby allowing the recipient device to present content that is based on the annotations. For example, an annotation can be generated by the annotation engine 224 to indicate the score for a particular word in a text message. The recipient device can utilize this score when rendering the text message, thereby allowing the recipient device to indicate to a recipient that the word may not accurately convey the word meant by the sender/user. Alternatively, or additionally, an annotation can be generated by the annotation engine 224 to indicate that another person's voice contributed to content of a text message, and/or that an intonation of the user changed during the spoken utterance, thereby allowing the recipient device to utilize this information when rendering the text message.

In some implementations, the system 200 can include an audio communication engine 226 that can determine whether to communicate audio data to a recipient device based on a variety of factors. For example, when the diarization engine 216 indicates that certain background noise is relevant to a text message, the audio communication engine 226 can cause audio data associated with the text message to be communicated to the recipient device. Alternatively, or additionally, when the score processing engine 218 indicates that a certain portion of a transcript for a text message was not generated with a threshold degree of confidence, the audio communication engine 226 can cause audio data to be communicated to the recipient device. Alternatively, or additionally, when the annotation engine 224 indicates another user contributed to content of a text message, or was otherwise speaking relevant content during the request from the user, the audio communication engine 226 can cause audio to be communicated to the recipient device.

Figure 3:
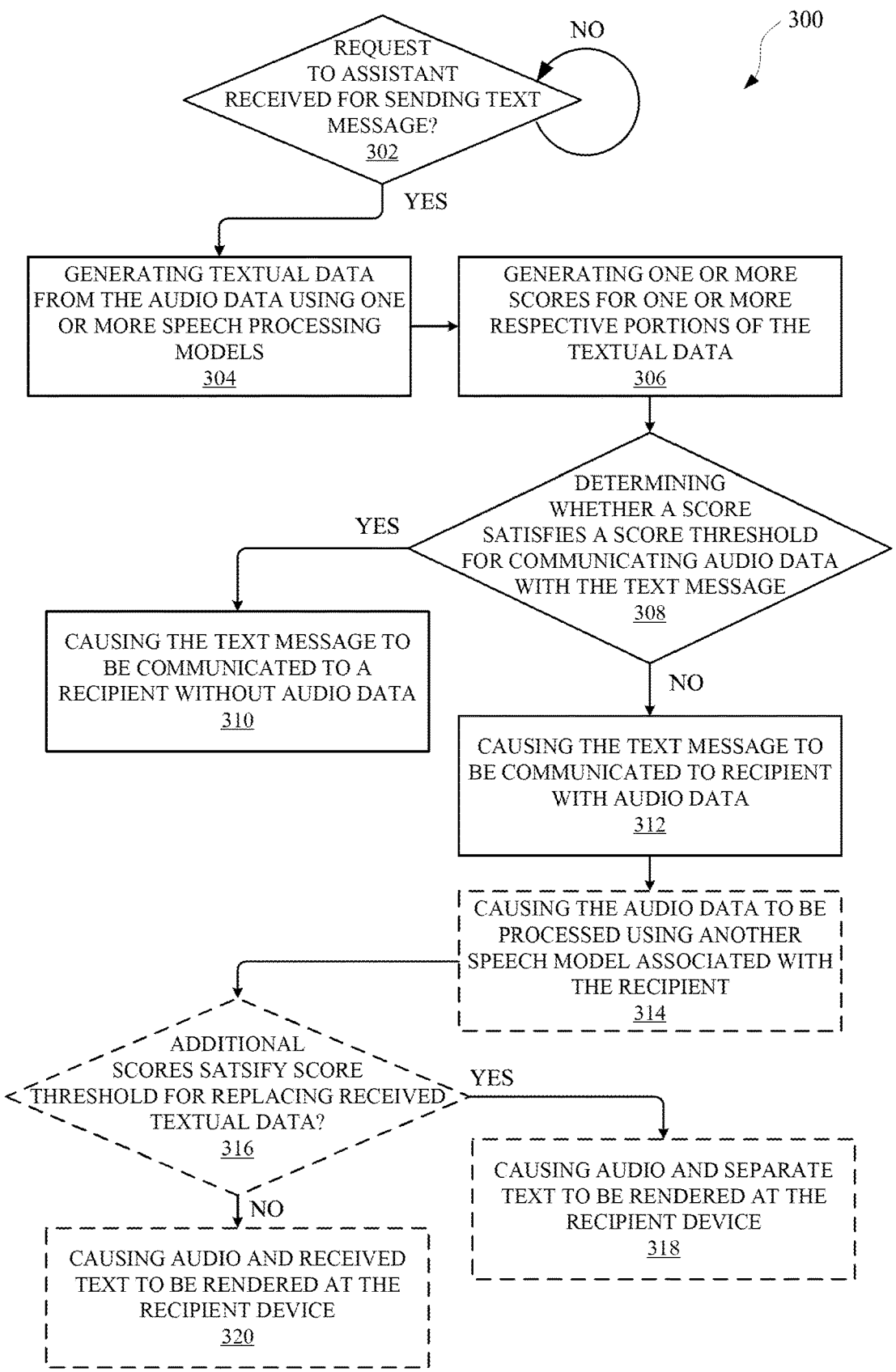
FIG. 3 illustrates a method for selectively providing audio of a spoken utterance with a text message when the audio is determined to be relevant to the text message and/or otherwise optimizes communications and/or computational resources.

FIG. 3 illustrates a method 300 for selectively providing audio of a spoken utterance with a text message when the audio is determined to be relevant to the text message and/or otherwise optimizes communications and/or computational resources. The method 300 can be performed by one or more computing devices, applications, and/or any other apparatus or module that can be associated with an automated assistant. The method 300 can include an operation 302 of determining whether an automated assistant received a request for sending a text message. The request can be embodied in a spoken utterance such as, "Assistant, send a text message to Mary saying, 'I'll be late to Mi Hacienda tonight." Audio captured by a device that provides access to the automated assistant can be processed using one or more speech processing techniques to determine the request. When the request is received, the method 300 can proceed to an operation 304 of generating textual data from the audio data of the spoken utterance using one or more speech processing models. The textual data can be generated to characterize at least a portion of the spoken utterance corresponding to the message content to be included in the text message.

In some implementations, the textual data is generated using one or more speech processing models that are trained using data associated with a user that communicated the request to the automated assistant. In this way, certain words, phrases, and/or phonemes can optionally be identified with some amount of bias towards textual content that the user be typically be associated with. The method 300 can proceed from the operation 304 to an operation 306 of generating one or more scores for one or more respective portions of the textual data. Score data can be utilized at any computing device associated with the user, and/or communicated to any device associated with a recipient, with prior permission from the user. Each score can indicate a confidence that a respective portion of the message content accurately characterizes a portion of audio captured by the automated assistant and/or other application. For example, a request from the user can be processed and transcribed as "I'll be late to me Hacienda tonight," and the word "me" can be generated with a confidence score of 20% (i.e., 0.20) because of the context of the word "me" and the adjacent terms surrounding "me" in the sentence.

The method 300 can proceed from the operation 306 to an operation 308 of determining whether a score satisfies a score threshold for communicating audio data with the text message. For example, the score of 20% for the word "me" can be compared to a score threshold (e.g., 80% or 0.80) and, when the score does not satisfy the score threshold, the method 300 can proceed from the operation 308 to an operation 312. Otherwise, when the score satisfies the score threshold, the method 300 can proceed to an operation 310, which can include causing the text message to be communicated to a recipient without audio data. In this way, the automated assistant can preserve computational resources, such as network bandwidth, by not always communicating audio with each text message. The operation 312 can include causing the text message to be communicated to the recipient with the audio data. In some implementations, the audio data can be parsed and/or otherwise processed according to one or more speech diarization processes in furtherance of limiting an amount of audio data that is communicated to a recipient and/or distinguish between relevant portions of audio data. For example, audio that embodies the user speaking the word "Mi" can be isolated, optionally with other audio for context (e.g., audio before and/or after the user speaking "Mi"), and communicated as audio data to the recipient with the text message. Otherwise, audio data characterizing the user speaking the entire text message can be communicated to the recipient.

The method 300 can proceed from the operation 312 to an optional operation 314 of causing the audio data to be processed using another speech model associated with the recipient. For example, because the score for the word "me" did not satisfy the score threshold, the received audio can be re-processed using a speech processing model associated with the recipient in furtherance of transcribing the audio with a greater degree of confidence. When the model associated with the recipient has been trained using pairs of training data with Spanish language audio and Spanish language text, the audio corresponding to the word "me" can be transcribed to the word "mi" and with a confidence score of 92%. The method 300 can then proceed from the operation 314 to an operation 316, which can include determining whether any additional score(s) satisfy the score threshold, or another score threshold, for replacing the received textual data with other textual data generated using the other speech model associated with the recipient.

According to the aforementioned example, the score for the word "Mi" can satisfy the score threshold and, as a result, the method 300 can proceed from the operation 316 to an operation 318, which can include causing audio and separate text to be rendered at the recipient device. In some implementations, the separate text can refer to the newly generated word, phrase, and/or phoneme that satisfies the score threshold. This newly generated text can then be rendered with, or in place of, the text message from the user to the recipient. Alternatively, when a new score resulting from re-processing of audio data does not satisfy the score threshold, or another score threshold, the method 300 can proceed to an operation 320, which can include causing audio and received text to be rendered at the recipient device. In this way, the original text message would be displayed for the recipient along with an option for the recipient to hear the audio of the text message as spoken by the user. In some implementations, a visible feature can be appended to the text message to indicate that a word, phrase, and/or phoneme was transcribed with a degree of confidence that did not satisfy a threshold degree of confidence.

Figure 4:
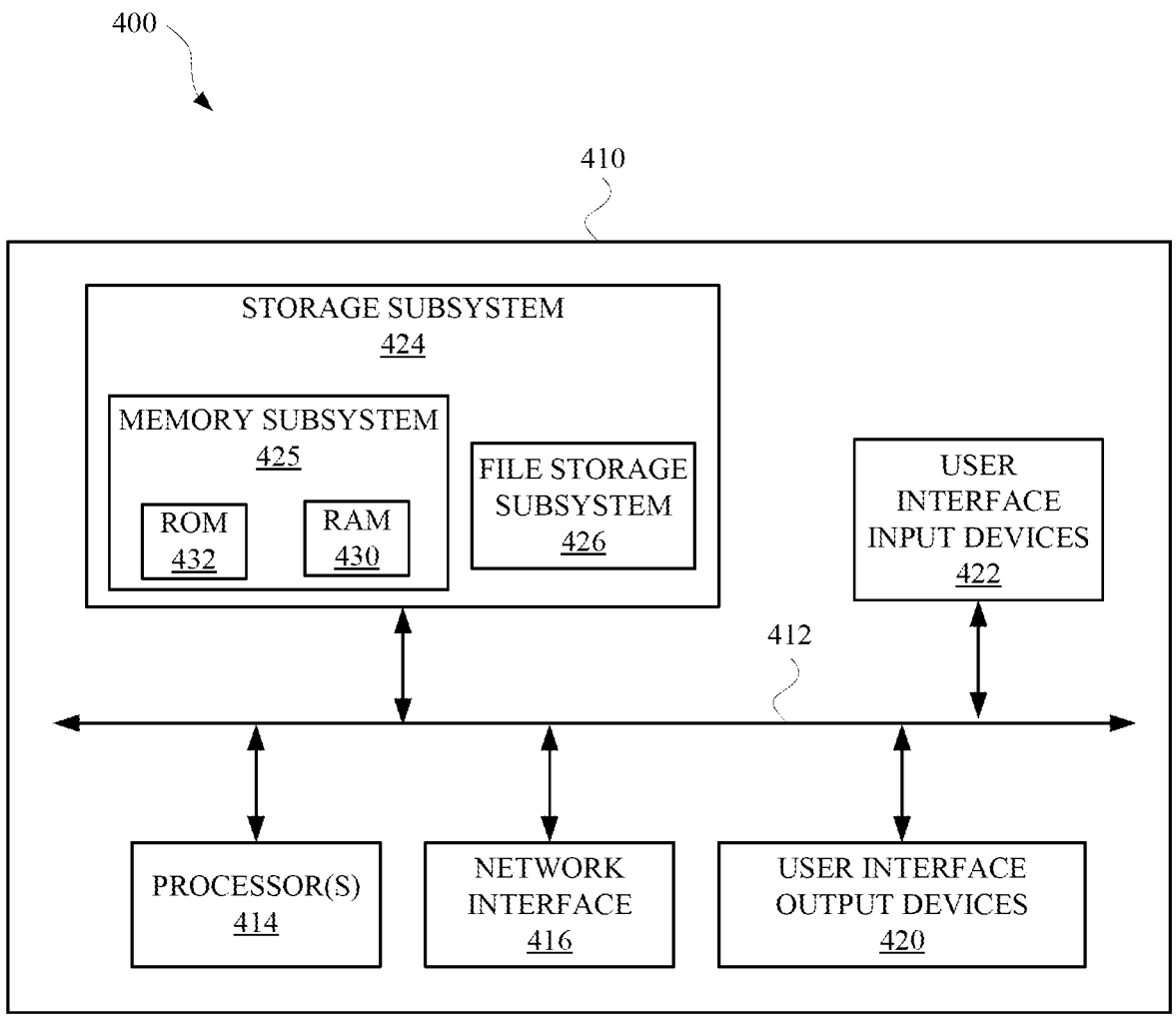
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, by an automated assistant, a spoken utterance from a user in furtherance of directing the automated assistant to send a text message to a separate device, wherein a computing device that provides access to the automated assistant captures audio data corresponding to the spoken utterance. The method can further include generating textual data from the audio data using one or more speech processing models, and one or more scores for one or more respective portions of the textual data, wherein the one or more scores indicate a degree of confidence that a portion of the textual data accurately characterizes a corresponding portion of the spoken utterance. The method can further include determining that a score of the one or more scores does not satisfy a score threshold for indicating whether to communicate an audio file with the text message. The method can further include causing, based on determining that the score does not satisfy the score threshold, the textual data and the audio data to be communicated to the separate device.

In some implementations, the score of the one or more scores corresponds to one or more words, phrases, or phonemes that do not comprise an entirety of the spoken utterance. In some implementations, the method can further include causing the textual data to be visually rendered at the separate device with a selectable link that, when selected, causes a snippet of the audio data, corresponding to the one or more words, phrases, or phonemes spoken by the user, to be audibly rendered. In some implementations, the method can further include causing, based on determining that the score does not satisfy the score threshold, the audio data to be processed using one or more speech processing models that have been trained using training data associated with a separate user of the separate device; and causing, based on the audio data being processed using the one or more speech processing models, additional textual data and one or more additional scores to be generated for one or more other words, phrases, or phonemes of the additional textual data.

In some implementations, the method can further include determining that that a separate score of the one or more additional scores satisfies the score threshold or another score threshold for rendering the additional textual data rather than the textual data; and causing, based on the separate score satisfying the score threshold or the other score threshold, the additional textual data to be visually rendered at the separate device. In some implementations, the method can further include determining contextual data associated with the user and/or the separate device, wherein causing the audio data to be communicated to the separate device is further based on the contextual data. In some implementations, the contextual data indicates that a threshold level of background noise is apparent at the separate device. In some implementations, the contextual data indicates that a separate user is speaking when the user is providing the spoken utterance to the automated assistant, and speech of the separate user is relevant to the spoken utterance.

In other implementations, a method implemented by one or more processors is set forth as including operations such as receiving, at a recipient computing device, textual data and audio data corresponding to a message communicated from a user of an automated assistant, wherein the user provided a spoken utterance to the automated assistant in furtherance of causing the message to be communicated to the recipient. The method can further include processing the textual data and the audio data in furtherance of generating additional textual data, wherein the textual data characterizes content of the spoken utterance and the additional textual data characterizes other content of the audio data. The method can further include determining, based on the textual data and the additional textual data, that the additional textual data characterizes the other content with a higher confidence than the textual data characterizes the content of the spoken utterance. The method can further include causing, based on the textual data and the additional textual data, the additional textual data to be rendered at the recipient computing device.

In some implementations, the method can further include determining contextual data associated with the recipient, wherein the contextual data indicates a level of background noise apparent at the recipient computing device; and causing the audio data to be rendered, or not rendered, at the recipient computing device based on the contextual data. In some implementations, the method can further include determining contextual data associated with the user, wherein the contextual data indicates speech of a separate person included in the audio data is relevant to the textual data or the additional textual data; and causing the audio data to be rendered at the recipient computing device based on the contextual data. In some implementations, the method can further include receiving score data that indicates a degree of confidence that the textual data characterizes the content of the spoken utterance; and generating, based on the additional textual data, additional score data that characterizes a separate degree of confidence that the additional textual data characterizes the other content of the audio data, wherein the higher confidence is determined based at least on the score data and the additional score data.

In yet other implementations, a method implemented by one or more processors is set forth as including operations such as receiving, by an automated assistant, a spoken utterance from a user in furtherance of directing the automated assistant to send a text message to a separate device, wherein a computing device that provides access to the automated assistant captures audio data corresponding to the spoken utterance. The method can further include generating, based on the audio data captured by the computing device, a speech recognition hypothesis that characterizes textual content of the spoken utterance. The method can further include generating, based on the audio data, speech diarization data that characterizes additional information associated with the spoken utterance. The method can further include determining, based on the speech diarization data, an amount of text of the speech recognition hypothesis to include in the text message to the separate device. The method can further include determining, based on the speech diarization data, a duration of audio of the spoken utterance to send, as audio data, to the separate device. The method can further include causing, by the automated assistant, the text message and the audio data to be communicated to the separate device, wherein the amount of text included with the text message is less than an entirety of content of the spoken utterance, and the duration of the audio of the spoken utterance is less than an entire duration of the spoken utterance received by the automated assistant.

In some implementations, wherein the additional information indicates that an intonation of the user changed during a portion of the spoken utterance, and wherein the amount of text does not include other content of the spoken utterance during a change in the intonation of the user. In some implementations, wherein the additional information indicates that a separate person was speaking during a portion of the spoken utterance, and wherein the duration of the audio includes other content of the spoken utterance when the separate person was speaking. In some implementations, wherein the additional information indicates a degree of confidence that a particular portion of the speech recognition hypothesis characterizes a corresponding portion of the spoken utterance, and wherein the amount of text does not include other content of the particular portion of the speech recognition hypothesis. In some implementations, the duration of the audio includes other audio content of the spoken utterance corresponding to the particular portion of the speech recognition hypothesis.

In some implementations, the method can further include causing the other audio content to be re-processed at the separate device in furtherance of generating other textual content to replace the particular portion of the speech recognition hypothesis, wherein the separate device renders the text message with the other textual content. In some implementations, the method can further include causing the separate device to generate score data that indicates a degree of confidence that the other textual content accurately characterizes natural language content of the other audio content, wherein the separate device renders the text message with the other textual content based on the score data satisfying a threshold confidence score. In some implementations, the score data is generated using a speech processing model that is trained from training data that is at least partially based on interactions between another user and the separate device.

We claim:

1. A method implemented by one or more processors, the method comprising:
   receiving, at a recipient computing device, textual data and audio data corresponding to a message communicated from a user of an automated assistant,
      wherein the user provided a spoken utterance to the automated assistant in furtherance of causing the message to be communicated to the recipient;
   processing the textual data and the audio data in furtherance of generating additional textual data,
      wherein the textual data characterizes content of the spoken utterance and the additional textual data characterizes other content of the audio data;
   determining, based on the textual data and the additional textual data, that the additional textual data characterizes the other content with a higher confidence than the textual data characterizes the content of the spoken utterance;
   causing, based on the textual data and the additional textual data, the additional textual data to be rendered at the recipient computing device;
   determining contextual data associated with the user,
      wherein the contextual data indicates speech of a separate person included in the audio data is relevant to the textual data or the additional textual data; and
   causing the audio data to be rendered at the recipient computing device based on the contextual data.

2. The method of claim 1,
   wherein the contextual data further indicates a level of background noise apparent at the recipient computing device.

3. The method of claim 1, further comprising:
   receiving score data that indicates a degree of confidence that the textual data characterizes the content of the spoken utterance; and
   generating, based on the additional textual data, additional score data that characterizes a separate degree of confidence that the additional textual data characterizes the other content of the audio data,
      wherein the higher confidence is determined based at least on the score data and the additional score data.

4. A method implemented by one or more processors, the method comprising:
   receiving, by an automated assistant, a spoken utterance from a user in furtherance of directing the automated assistant to send a text message to a separate device,
      wherein a computing device that provides access to the automated assistant captures audio data corresponding to the spoken utterance;
   generating, based on the audio data captured by the computing device, a speech recognition hypothesis that characterizes textual content of the spoken utterance;
   generating, based on the audio data, speech diarization data that characterizes additional information associated with the spoken utterance;
   determining, based on the speech diarization data, an amount of text of the speech recognition hypothesis to include in the text message to the separate device;
   determining, based on the speech diarization data, a duration of audio of the spoken utterance to send, as audio data, to the separate device; and
   causing, by the automated assistant, the text message and the audio data to be communicated to the separate device,
      wherein the amount of text included with the text message is less than an entirety of content of the spoken utterance, and the duration of the audio of the spoken utterance is less than an entire duration of the spoken utterance received by the automated assistant.

5. The method of claim 4,
   wherein the additional information indicates that an intonation of the user changed during a portion of the spoken utterance, and wherein the amount of text does not include other content of the spoken utterance during a change in the intonation of the user.

6. The method of claim 4,
wherein the additional information indicates that a separate person was speaking during a portion of the spoken utterance, and
wherein the duration of the audio includes other content of the spoken utterance when the separate person was speaking.

7. The method of claim 4,
wherein the additional information indicates a degree of confidence that a particular portion of the speech recognition hypothesis characterizes a corresponding portion of the spoken utterance, and
wherein the amount of text does not include other content of the particular portion of the speech recognition hypothesis.

8. The method of claim 7, wherein the duration of the audio includes other audio content of the spoken utterance corresponding to the particular portion of the speech recognition hypothesis.

9. The method of claim 8, further comprising:
causing the other audio content to be re-processed at the separate device in furtherance of generating other textual content to replace the particular portion of the speech recognition hypothesis,
wherein the separate device renders the text message with the other textual content.

10. The method of claim 9, further comprising:
causing the separate device to generate score data that indicates a degree of confidence that the other textual content accurately characterizes natural language content of the other audio content,
wherein the separate device renders the text message with the other textual content based on the score data satisfying a threshold confidence score.

11. The method of claim 10, wherein the score data is generated using a speech processing model that is trained from training data that is at least partially based on interactions between another user and the separate device.

12. A system comprising:
memory storing instructions;
one or more processors operable to execute the instructions to:
receive, by an automated assistant, a spoken utterance from a user in furtherance of directing the automated assistant to send a text message to a separate device, wherein a computing device that provides access to the automated assistant captures audio data corresponding to the spoken utterance;
generate, based on the audio data captured by the computing device, a speech recognition hypothesis that characterizes textual content of the spoken utterance;
generate, based on the audio data, speech diarization data that characterizes additional information associated with the spoken utterance;
determine, based on the speech diarization data, an amount of text of the speech recognition hypothesis to include in the text message to the separate device;
determine, based on the speech diarization data, a duration of audio of the spoken utterance to send, as audio data, to the separate device; and
cause, by the automated assistant, the text message and the audio data to be communicated to the separate device,
wherein the amount of text included with the text message is less than an entirety of content of the spoken utterance, and the duration of the audio of the spoken utterance is less than an entire duration of the spoken utterance received by the automated assistant.

13. The system of claim 12,
wherein the additional information indicates that an intonation of the user changed during a portion of the spoken utterance, and
wherein the amount of text does not include other content of the spoken utterance during a change in the intonation of the user.

14. The system of claim 12,
wherein the additional information indicates that a separate person was speaking during a portion of the spoken utterance, and
wherein the duration of the audio includes other content of the spoken utterance when the separate person was speaking.

15. The system of claim 12,
wherein the additional information indicates a degree of confidence that a particular portion of the speech recognition hypothesis characterizes a corresponding portion of the spoken utterance, and
wherein the amount of text does not include other content of the particular portion of the speech recognition hypothesis.

16. The system of claim 15, wherein the duration of the audio includes other audio content of the spoken utterance corresponding to the particular portion of the speech recognition hypothesis.

17. The system of claim 16, wherein one or more of the processors are further operable to execute the instructions to:
cause the other audio content to be re-processed at the separate device in furtherance of generating other textual content to replace the particular portion of the speech recognition hypothesis,
wherein the separate device renders the text message with the other textual content.

18. The system of claim 17, wherein one or more of the processors are further operable to execute the instructions to:
cause the separate device to generate score data that indicates a degree of confidence that the other textual content accurately characterizes natural language content of the other audio content,
wherein the separate device renders the text message with the other textual content based on the score data satisfying a threshold confidence score.

19. The system of claim 18, wherein the score data is generated using a speech processing model that is trained from training data that is at least partially based on interactions between another user and the separate device.

* * * * *